United States Patent Office 3,146,274
Patented Aug. 25, 1964

---

3,146,274
OXIDATION OF HALOGEN-CONTAINING MONO-OLEFINIC COMPOUNDS
William F. Brill, Skillman, N.J., assignor to Petro-Tex Chemical Corporation, Houston, Tex., a corporation of Delaware
No Drawing. Filed May 20, 1960, Ser. No. 30,427
5 Claims. (Cl. 260—633)

This invention relates to oxidation of halogen-containing olefinic materials. More particularly, it relates to the production of aliphatic polyhalohydrins from halogen-containing mono-olefinic compounds by the oxidation of halogen-containing mono-olefinic compounds in the liquid phase.

It is an object of the present invention to provide a useful and improved method for the preparation of aliphatic polyhalohydrins. It is a further object of this invention to provide a method for the preparation of aliphatic chlorohydrins from chlorine-containing olefins. These and other objects will be apparent from the description which follows.

I have unexpectedly found that polyhalohydrins of the general formula

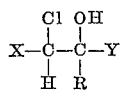

may be produced from olefinic compounds of the general formula

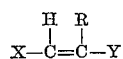

wherein —R is selected from the group consisting of —H and

—X is selected from the group consisting of —H and

—Y is selected from the group consisting of

and

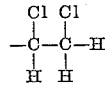

the total number of chlorine atoms is no greater than three and the total number of carbon atoms is no greater than five. The defined polyhalohydrins may be prepared in accordance with this invention from the corresponding halogen-containing mono-olefin by oxidation of the halogen-containing mono-olefin in the liquid phase with oxygen.

It would have been expected that the oxidation of the halogen-containing olefins would have formed peroxides and that these peroxides would catalyze the olefinic compounds to dimers and other products. Furthermore, in view of the ethylenic unsaturation of the halogen-containing olefinic materials, it might have been expected that fission of the double bond with the production of carboxylic acids of lower molecular weight might take precedence over the formation of halohydrins at the double bond.

The polyhalohydrins of this invention are produced by a process whereby halogen-containing olefins are oxidized in the liquid phase with oxygen. For example, 1,3,4-trichlorobutanol-2 is produced by the oxidation of 1,4-dichlorobutene-2 in the liquid phase by passing oxygen therethrough. The halogen-containing olefins found useful as starting materials for preparing the defined polyhalohydrin are the allylic halides such as allyl chloride, methallyl chloride, 1,4-dichlorobutene-2 and 3,4-dichlorobutene-1 and the like and other halogen-containing compounds of the general formula such as allyl bromide, 3-chloro-4-bromobutene-1 and the like.

The oxidations are conducted in the liquid phase at either subatmospheric, atmospheric or above atmospheric pressure. The pressure employed is generally from about atmospheric to about 500 p.s.i. or higher, with a preferred pressure range of from about one atmosphere to about 300 p.s.i. When using halogen-containing compounds of relatively low boiling point such as allyl chloride it is necessary to conduct the oxidation under pressure when the temperature of oxidation is above the boiling point of the halogen-containing compound.

The temperature of oxidation may be varied from about 25° C. to about 250° C. Normally the temperature range is from about 50° C. to about 200° C., and more preferably from about 70° C. to about 110° C. The choice of temperature for the reaction is primarily dependent upon the desired rate of reaction. If a slow rate of reaction is preferred, the correspondingly lower temperature may be utilized. Oxygen may be supplied to the oxidation reaction either as pure oxygen or as oxygen mixed with inert gases including nitrogen and helium. Air may be used.

The oxygen may be contacted by admixture with the halogen-containing olefin in any convenient manner. The oxygen may simply be bubbled through the reaction mass, or equipment particularly adapted to gas-liquid mixing may be used. Mixers such as bubble towers, turbo-absorbers, scrubbers and devices for recirculating through towers or nozzles are useful. The gas and liquid flow may be in the same direction or counter-current.

While the reaction may be conducted without the addition of a catalyst, the rate of reaction may be increased by the use of an oxidation catalyst. These catalysts may be finely divided polyvalent metals which have an atomic number of about 22 to about 82. Compounds of metals are also useful, including the oxides, and the inorganic or organic salts. Examples of the types of catalyst that may be employed are the metals such as cobalt, vanadium, cerium, copper, manganese, silver and uranium and the combination of these metals with organic, hydrochloric, nitric or phosphoric acids. Specific examples of useful compounds are cobaltic acetylacetonate, cobaltous chloride, cobalt naphthenate, cobalt acetate, magnesium oxide, manganese acetate, barium acetate and barium butyrates. The preferred catalysts are cobalt salts, including cobaltic acetylacetonate, cobalt naphthenate, cobaltous acetate, and cobaltous chloride.

The oxidation may be promoted by the addition of alkaline earth or alkali metals or the salts thereof such as magnesium acetate. Lead and the lead salts have been found useful. The oxidation may also be promoted by addition of free radical generating compounds. Examples of these types are inorganic and organic peroxides and the azo-aliphatic-nitrile catalysts. Examples of such promoters are hydrogen peroxide, cumene hydroperoxide, tert-butyl hydroperoxide, diacetyl peroxide, sodium peroxide, peracetic acid, perbenzoic acid, potassium persulfate and 2-azo-bis-isobutyronitrile. Combinations of one or more of the catalysts or promoters may be used. The proportions of catalyst and promoters used may vary from a few parts per million based on the halogen-containing olefin up to about 20 weight percent. Generally, the concentration of the catalyst will be, on a molar basis, from about .001 to about 0.10 mole per mole of halogen-containing olefin. The concentration of the catalyst promoters will also generally be from about .001 to about 0.10 mole based on the moles of halogen-containing olefin. The catalysts and promoters may be added to the reaction initially or added during the reaction. However, it has generally been found that once the oxidation has been initiated the reaction will maintain itself.

The oxidation of the halogen-containing olefin may be conducted either in bulk or in the presence of a liquid medium which may be either a solvent or diluent for the halogen-containing olefin. The solvents or diluents should be inert to oxidation under the defined reaction conditions. Liquid media such as water, organic acids, saturated aliphatic hydrocarbons, benzene and carbon tetrachloride may be used. The liquid medium may be present from 1 to 99 percent by weight of the total reaction mixture or preferably from 25 to 85 percent of the total.

The oxidation process produces a mixture of products, and the desired polyhalohydrins are separated from the other constituents by conventional processes such as distillation and/or solvent extraction.

The following examples are representative embodiments of the invention. All percentages are on a weight basis unless stated otherwise. The concentrations of catalysts and "added ingredients" are based on the weight of the halogen-containing olefinic materials. In the following examples all of the halogen-containing olefins were purified by fractionation before use. Oxidations at atmospheric pressure were conducted in a magnetically stirred vessel, using U.S.P. cylinder oxygen. For pressure oxidations, a 1.4 liter stirred stainless steel autoclave was used. The reactors were cooled to remove the exothermic heat of reaction.

*Example 1*

At 200 p.s.i., 487.1 g. (5.37 moles) of methallyl chloride containing 20 g. (0.5 mole) of light magnesium oxide (crystalline magnesium oxide obtained by heating the carbonate) and 4.8 g. (0.053 mole) of ter-butyl hydroperoxide was oxidized at 100° C. by bubbling oxygen therethrough with an off gas of 0.2 l./min. The reaction slowed and was terminated at 375 minutes after the consumption of 3.55 moles of oxygen. The liquid oxidation product weighed 510 g. The desired halohydrin product, 1,3-dichloro-2-methyl propanol-2, was obtained therefrom by fractionation. The 1,3-dichloro-2-methyl propanol-2 was purified by fractionation and had a B.P. 62.8° C./14 mm.; $n_D^{20}$ 1.4708; $d_4^{20}$ 1.250. The 1,3-dichloro-2-methyl propanol-2 was characterized by forming the bis 2-naphthyl ether derivative which was recrystallized from alcohol-water and melted at 146–148° C. Chloroacetone was also a constituent of the oxidation product.

*Example 2*

One mole (90.6 g.) of methallyl chloride containing 0.005 mole (1.8 g.) of cobaltic acetylacetonate and 0.02 mole (5.0 g.) of cumene hydroperoxide was oxidized at 60° C. by bubbling oxygen through the methallyl chloride. Consumption of oxygen after 6 hours showed a constant rate at $9.7 \times 10^{-7}$ moles $O_2$/mole olefin/sec. Total oxygen consumed was 0.22 mole. The product, 1,3-dichloro-2-methyl propanol-2, was obtained by fractionation of the liquid reaction product.

*Example 3*

6.5 moles (497.3 g.) of allyl chloride containing 0.5 mole (20.0 g.) of light magnesium oxide was oxidized by passing oxygen through the allyl chloride. The oxidation was conducted at 200 p.s.i. and 100° C. for 440 minutes and 2.4 moles (76.8 g.) of oxygen was consumed. Consumption of oxygen began in 120 minutes and a constant maximum rate of $2.5 \times 10^{-5}$ moles $O_2$/mole olefin/sec. was reached in approximately 260 minutes. 1,3-dichloropropanol was isolated as a pure liquid by fractionation of the reaction mixture and identified from the melting point and mixed melting of its phenyl urethane derivative, M.P. 172–173° C.

*Example 4*

1,4-dichlorobutene-2 was oxidized by bubbling oxygen therethrough at 90° C. for 27 hours, and 0.74 mole of oxygen was consumed. The reaction solution weighed 81 g. and was taken up in chloroform, washed with water and cold dilute sodium bicarbonate to remove acids and aldehyde, and dried over a dessicant, porous anhydrous calcium sulfate. 13 g. of unreacted 1,4-dichlorobutene-2 was recovered by distillation. No 1,3-isomer was obtained or detected by infrared examination. 14.8 g. trichlorobutanol representing a 28 percent yield was collected at 68–77/1 mm.. The refractive index of the trichlorobutanol was $n_D^{25}$ 1.4980 and the material analyzed 46.8 percent for chlorine (calcd. 59.9).

*Example 5*

3,4-dichlorobutene-1 containing 0.5 percent cobalt naphthenate was oxidized by bubbling oxygen therethrough at 90° C. and 0.16 mole oxygen was consumed in 24 hours. The trichlorobutanol product weighed 9.6 g. and was collected at 76° C./2 mm.

*Example 6*

Two moles of 3,4-dichlorobutene-1 in acetic acid was oxidized as described above, and the reaction product was distilled. The desired trichlorobutanol was produced and was characterized by its urethane derivative which had a M.P. 132–133° C. Pure 1,3,4-trichlorobutanol-2 was obtained by refluxing the impure chlorohydrin from the dichlorobutene with five times its weight of 1 N methanolic hydrogen chloride. Methyl acetate could be removed as it was formed. The solution was neutralized with solid barium carbonate, filtered and distilled. The product which was collected at 80°/1 mm. contained 9.8 percent free hydroxyl (calcd. 9.6 percent) and had a refractive index of $n_D^{25}$ 1.5022. A phenyl urethane derivative was prepared by heating the 1,3,4-trichlorobutanol-2 with phenylisocyanate at 100° C. for 20 minutes and extracting the product with hot ligroin. Recrystallization from ligroin or carbon tetrachloride did not improve the melting point, 132–133° C. The residue from the extraction melted slightly less sharply at 132° C. Admixtures of derivatives from the chloro-alcohols from both isomeric dichlorobutenes did not show a depressed melting point.

*Analysis.*—Calcd. for $C_{11}H_{12}O_2Cl_3N$: C, 44.54; H, 4.08; Cl, 35.87. Found: C, 44.72; H, 4.51; Cl, 35.00.

Reaction of the 1,3,4-trichlorobutanol-2 with 200 percent sodium hydroxide gave an 80 percent yield of the dichloroepoxy butane distilling at 73–75°/10 mm. which had a refractive index of $n_D^{20}$ 1.4767. Oxirane oxygen by titration with hydrogen bromide was found to be 11.1 percent (calcd. for $C_4H_6Cl_2O$: 11.3 percent).

Examples 7 Through 14

In these examples, 3,4-dichlorobutene-1 was oxidized at 90° C. in an acetic acid solution at the indicated concentration of 3,4-dichlorobutene-1. The oxidation rate is given in moles of oxygen consumed per mole of initial dichlorobutene per minute.

| Example | Molar Conc. of dichlorobutene, g. mole/liter | Catalyst | Added Ingredients | Oxidation Rate |
|---|---|---|---|---|
| 7 | 2.0 | 0.1 M Cobaltous acetate. | | $10 \times 10^{-4}$ |
| 8 | 1.0 | ------do------ | | $7.6 \times 10^{-4}$ |
| 9 | 2.0 | 0.50 M Cobaltous acetate. | | $7.8 \times 10^{-4}$ |
| 10 | 2.0 | ------do------ | 0.015 M Hydrochloric acid. | $5.5 \times 10^{-4}$ |
| 11 | 2.0 | 0.05 M Cobaltous acetate. | 0.1 M Sodium acetate. | $5.5 \times 10^{-4}$ |
| 12 | 2.0 | ------do------ | 0.2 M Lithium chloride. | $3.2 \times 10^{-4}$ |
| 13 | 2.0 | ------do------ | | $11.0 \times 10^{-4}$ |
| 14 | 1.0 | 0.5 M percent Cobalt as cobaltous naphthenate. | | $3.2 \times 10^{-4}$ |

The oxidations took place at the indicated rates and 1,3,4-trichlorobutanol-2 was separated by distillation of the reaction product in each example.

Examples 15 Through 24

In these examples, 1,4-dichlorobutene-2 was oxidized in an acetic acid solution, with the exception of Examples 21, 22, 23 and 24 where no solvent was used. The oxidation rate is given in moles oxygen consumed per mole of initial dichlorobutene per minute.

| Example | Oxidation Temp., °C. | Molar Conc. of dichlorobutene, g. mole/liter | Catalyst | Added Ingredients | Oxidation Rate |
|---|---|---|---|---|---|
| 15 | 90 | 2 M | 0.10 M Cobaltous acetate. | | $13 \times 10^{-4}$ |
| 16 | 90 | 2 M | ------do------ | 0.40 M Lead acetate. | $26 \times 10^{-4}$ |
| 17 | 90 | 2 M | 0.10 M Cabaltous chloride. | | $30 \times 10^{-4}$ |
| 18 | 100 | 2M | ------do------ | | $23 \times 10^{-4}$ |
| 19 | 80 | 2 M | ------do------ | 1.0 percent 2-Azo-bis-isobutyronitrile. | $20 \times 10^{-4}$ |
| 20 | 70 | 2 M | ------do------ | | $8 \times 10^{-4}$ |

| Example | Oxidation Temp., °C. | Moles of dichlorobutene | Catalyst | Added Ingredients | Oxidation Rate |
|---|---|---|---|---|---|
| 21 | 90 | 8 M | 0.5 mole percent Cobalt as cobalt naphthenate. | None | $6.8 \times 10^{-4}$ |
| 22 | 90 | 8 M | None | 1.0 percent 2-azo-bis-isobutyronitrile. | $10 \times 10^{-4}$ |
| 23 | 80 | 8 M | 0.50 mole percent Cobalt as cobalt naphthenate. | 20.0 percent light magnesium oxide. | $11 \times 10^{-4}$ |
| 24 | 80 | 8 M | | 20.0 percent magnesium oxide. | $13 \times 10^{-4}$ |

The oxidation took place at the indicated rate and 1,3,4-trichlorobutanol-2 was separated by distillation in each example.

The polyhalohydrins produced according to this invention are useful as cross-linking agents for synthetic resins such as glycerol-phthalic anhydride alkyd resins. The polyhalohydrins are readily converted to the corresponding oxirane compounds by heating the halohydrins in a dilute caustic solution, for example, at 60° C. The epihalohydrins thus formed are used in the formation of epoxy resins. The synthesis of epoxy resins from epihalohydrins is described in Greenlee, U.S. 2,694,694, and in Lee and Neville, Epoxy Resins, pages 1–21 (McGraw-Hill Pub. Co., 1957). Both the mono- and the polyhalohydrins produced by this invention are useful in forming epoxy resins.

While the invention has been described in detail and preferred embodiments have been given, it is understood that various changes may be made and equivalent ingredients substituted without departing from the scope of the invention.

I claim:

1. A process for the preparation of compounds of the formula

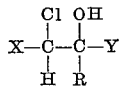

which comprises admixing halogen-containing olefins of the formula

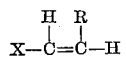

wherein —R is selected from the group consisting of —H and

—X is selected from the group consisting of —H and

and —Y is selected from the group consisting of

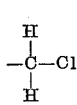

and

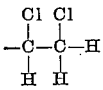

and the total number of chlorine atoms is no greater than three and the total number of carbon atoms is no greater than five, in liquid phase, with oxygen at a temperature of about 25° C. to about 250° C.

2. The process according to claim 1 wherein the said halogen-containing olefin is allyl chloride.

3. The process according to claim 1 wherein the said halogen-containing olefin is methallyl chloride.

4. A process for the formation of 1,3,4-trichlorobutanol-2 which comprises admixing 1,4-dichlorobutene-2 in liquid phase with oxygen in the presence of an oxidation catalyst at a temperature of about 25° C. to about 250° C., said oxidation catalyst being selected from the group consisting of cobaltic acetylacetonate, cobaltous chloride, cobalt naphthanate, cobalt acetate, magnesium oxide, manganese acetate, barium acetate, and barium butyrates.

5. A process for the formation of 1,3,4-trichlorobutanol-2 which comprises admixing 3,4-dichlorobutene-1 in liquid phase with oxygen in the presence of an oxidation catalyst at a temperature of about 25° C. to about 250° C., said oxidation catalyst being selected from the group consisting of cobaltic acetylacetonate, cobaltous chloride, cobalt naphthanate, cobalt acetate, magnesium oxide, manganese acetate, barium acetate, and barium butyrates.

References Cited in the file of this patent

UNITED STATES PATENTS

| | | |
|---|---|---|
| 2,052,095 | Joshua et al. | Aug. 25, 1936 |
| 2,296,687 | Rosenstein | Sept. 22, 1942 |
| 2,554,533 | Ladd | May 29, 1951 |

FOREIGN PATENTS

| | | |
|---|---|---|
| 555,436 | Canada | Apr. 1, 1958 |

UNITED STATES PATENT OFFICE
CERTIFICATE OF CORRECTION

Patent No. 3,146,274            August 25, 1964

William F. Brill

It is hereby certified that error appears in the above numbered patent requiring correction and that the said Letters Patent should read as corrected below.

Column 4, line 40, for "46.8" read -- 56.8 --; column 5, in the second table, fourth column, lines 5 and 6 thereof, for "Cabaltous" read -- Cobaltous --; column 6, lines 32 and 33, the formula should appear as shown below instead of as in the patent:

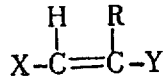

Signed and sealed this 6th day of April 1965.

(SEAL)
Attest:

ERNEST W. SWIDER
Attesting Officer

EDWARD J. BRENNER
Commissioner of Patents